No. 759,471. PATENTED MAY 10, 1904.
H. RICK.
BURGLAR PROOF GRATING.
APPLICATION FILED JAN. 21, 1903.
NO MODEL.
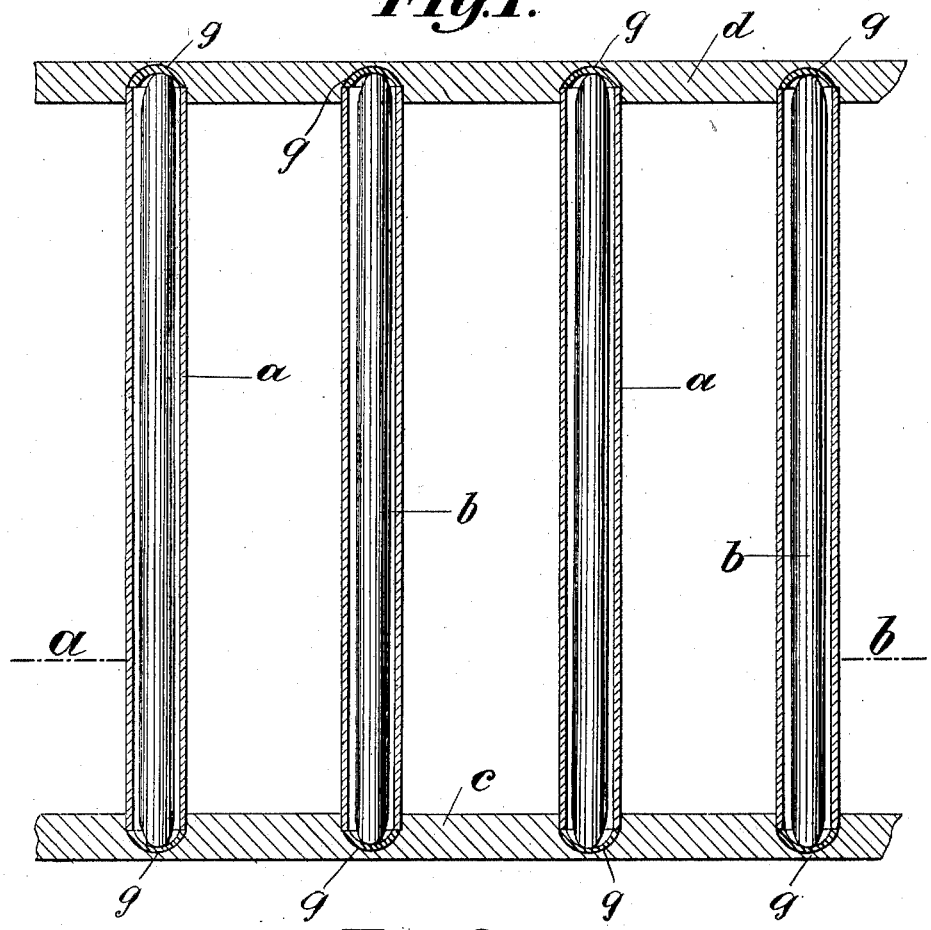
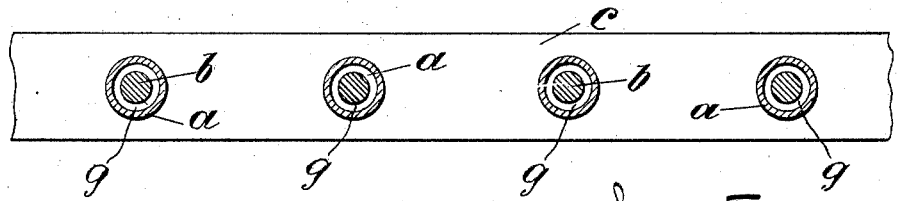

No. 759,471. Patented May 10, 1904.

UNITED STATES PATENT OFFICE.

HEINRICH RICK, OF GODESBERG, GERMANY.

BURGLAR-PROOF GRATING.

SPECIFICATION forming part of Letters Patent No. 759,471, dated May 10, 1904.

Application filed January 21, 1903. Serial No. 140,051. (No model.)

*To all whom it may concern:*

Be it known that I, HEINRICH RICK, a subject of the German Emperor, residing at Godesberg, Germany, have invented certain new and useful Improvements in Burglar-Proof Gratings, of which the following is a specification.

The subject of the present invention is a burglar-proof grating for windows, doors, banks, prisons, &c. The essential feature of the invention is that the individual bars of the grating are made of steel tubing and are let into the iron forming the top and bottom of the grating. Within these steel tubes and likewise let into the iron at the top and bottom of the grating are steel rods which, however, have a certain amount of play within the tubes and are so arranged that they can easily rotate. In consequence of this arrangement it is impossible for such a grating to be filed through.

The invention is illustrated in the accompanying drawings, in which—

Figure 1 is a longitudinal section through one portion of the grating; and Fig. 2 is a cross-section on the line A B, Fig. 1.

The grating-bars $a$, made of steel tubing, are let into the iron bars $c$ and $d$. Within the steel tubes $a$ are the steel rods $b$, which are likewise let into the iron bars $c$ and $d$, in such a way, however, that they can easily rotate. If now the steel tubes $a$ are filed through and the inner rods $b$ attacked, they will move round and round under the action of the file, and consequently it is absolutely impossible to file them through.

It should be pointed out that this grating is not merely applicable to windows and doors, but also renders impossible breaking in through the floor, as also through the sides or ceiling of the room. Accordingly a room which is provided throughout with this device is completely protected against any one breaking in or out.

The device can lie hidden when used for walls and ceilings.

The supports $g$, in which the movable steel rods rest, should be made of good rust-proof metal, such as copper or brass, which offers to the movable rods an easier and better bearing and insures free rotation of the rods.

If when of great length a bending of the outer tubes is to be feared, this disadvantage may be overcome by intermediate cross-bars.

What I claim, and desire to secure by Letters Patent of the United States, is—

A burglar-proof grating comprising rotatable rods, tubular bars inclosing the rods, and bearings for the rods and in which the rods are rotatable, said bearings being of a rust-proof material.

In testimony whereof I have hereunto set my hand in the presence of two witnesses.

HEINRICH RICK.

Witnesses:
W. FREIHERR VON LYNCKEER,
CARL SCHMITT.